Nov. 4, 1952
G. A. HOGGATT
2,616,789
METHOD OF PRODUCING GYPSUM PLASTER
Filed March 19, 1951
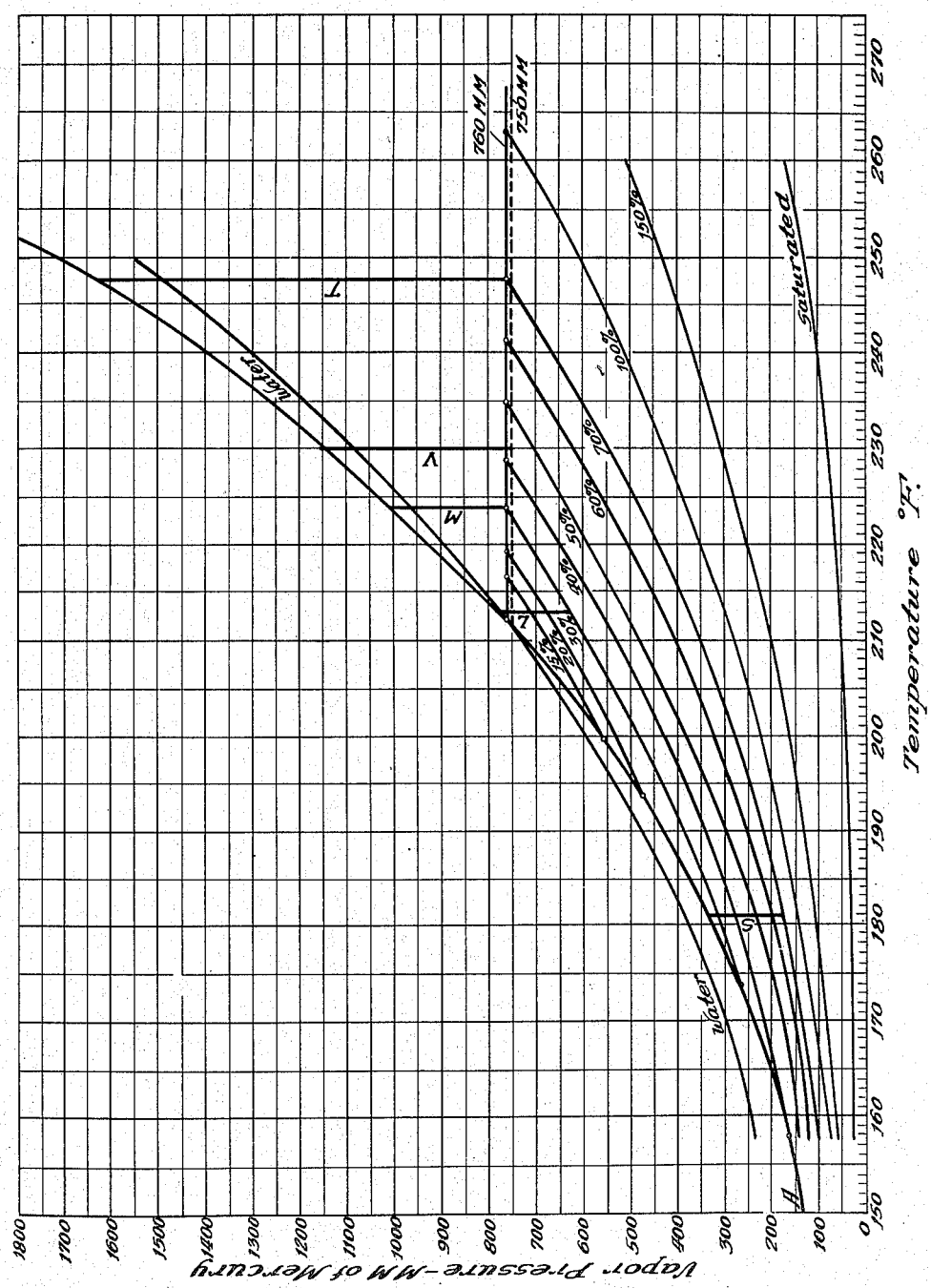
Inventor:
Gilbert A. Hoggatt
By: Ferd Bing
Attorney Patented Nov. 4, 1952

2,616,789

UNITED STATES PATENT OFFICE 2,616,789

METHOD OF PRODUCING GYPSUM PLASTER

Gilbert A. Hoggatt, Park Ridge, Ill., assignor to Certain-Teed Products Corporation, Ardmore, Pa., a corporation of Maryland Application March 19, 1951, Serial No. 216,434

8 Claims. (Cl. 23—122)

This invention relates to a process of producing calcium sulphate in the form of calcium sulphate hemihydrate ($CaSO_4 \cdot \frac{1}{2}H_2O$) from calcium sulphate dihydrate ($CaSO_4 \cdot 2H_2O$). The invention particularly relates to a process of producing gypsum plasters which are capable of setting upon mixture with water.

This application is a continuation-in-part of applicant's copending application Serial No. 526,005, filed March 11, 1944, now forfeited.

In the production of calcium sulphate hemidydrate in the form of plasters, gypsum, which consists predominantly of calcium sulphate dihydrate, ordinarily is heated in a dry state to drive off the water of crystallization to reduce the combined water from two molecules ($CaSO_4 \cdot 2H_2O$)

to one-half molecule ($CaSO_4 \cdot \frac{1}{2}H_2O$) per molecule of calcium sulphate. In common manufacturing practice, gypsum rock is mined, reduced to suitable particle size, and calcined in a kettle or a rotary calciner, heated to raise the temperature of the mass of gypsum to that at which the water of crystallization is driven off.

Calcined gypsum as ordinarily produced in the form of gypsum plasters or plaster of Paris has the capacity to take up water of crystallization and to set. The time required for setting of a mortar or slurry made of a mixture of calcined gypsum and water, the amount of water required to produce a given consistency of the mortar or slurry, the plasticity and other qualities of the mortar or slurry, and the strength, density and hardness and other qualities of the cast made therefrom vary with different raw materials and with the conditions of calcination. This invention is particularly concerned with that quality of the calcium sulphate hemihydrate which determines the amount of water which is required to produce a given consistency in a mixture of the hemihydrate with water. Calcined gypsum as ordinarily produced in a calcining kettle requires a relatively large amount of water to produce a given consistency, for example, the so-called "pouring consistency" at which the mixture may be poured, for example, into a mold. The amount of water used in mixing has considerable effect upon the strength and density of the set product. It is well recognized that reduction in the amount of water used to produce a mortar or slurry of a calcium sulphate hemihydrate or a calcined gypsum plaster increases the strength as well as the density of the resulting cast or set product. The invention is concerned with a process which makes it possible to use, with the product of this process, a greatly reduced amount of water to produce a given consistency as compared with ordinary calcined gypsum plasters and thereby to secure in the set product high density, hardness and strength.

Heretofore, it has been proposed to produce so-called calcined gypsum or calcium sulphate hemihydrate having a "low water carrying capacity," requiring only a small amount of water to produce a given consistency. In the patent to Randel and Dailey 1,901,051, March 14, 1933, is disclosed a process of calcining gypsum under steam pressure of limited range above atmospheric pressure to produce what is termed "alpha gypsum" having a crystalline structure characterized by crystals which are non-porous, short, relatively thick rods or prisms. In the patent to Schoch, 1,989,712, of February 5, 1935, there is disclosed a process of heating gypsum in a solution of magnesium sulphate at the boiling temperature of the solution preferably secured by raising the pressure of boiling in a closed vessel above atmospheric pressure. In a paper entitled "Production of Gypsum Plaster by Wet Methods" by E. P. Schoch and William A. Cunningham, Transactions, volume 37 of 1941, American Institute of Chemical Engineers, reference is made to both said patents. It is stated in this paper that heating calcium sulphate dihydrate in a magnesium sulphate solution produced crystals which were stort and rodlike. This paper also states that such crystals could not be produced in solutions of sodium chloride and calcium chloride. It indicates for the product produced by heating in magnesium sulphate a water-carrying capacity of similar degree to that disclosed in the Randel and Dailey patent.

In this paper the term "water-carrying capacity" is stated to be the amount of water required to make a slurry of normal consistency. While the term "normal consistency" is not defined, it is implied that this term has the meaning as defined by the American Society of Testing Materials. In the Randel and Dailey Patent No. 1,901,051 "normal consistency" is defined as "that amount of water in cubic centimeters or grams, which, when mixed with 100 grams of dry stucco will produce a mix of such consistency that it will just pour from a cup."

This definition, however, is not in agreement with the definition of "normal consistency" given by the American Society for Testing Materials. The terms "testing consistency" and "normal consistency" are defined as equivalent to each other by the American Society for Testing Materials under the designations C-26-33 and C-26-42 for the Standard Method for Testing Gypsum and Gypsum Products. For the purposes of the present invention, for the most part it is sufficient to indicate the results obtained as measured by "pouring consistency" which substantially is the same as the "normal consistency" defined in the Randel and Dailey patent.

Contrary to the experience described in the disclosures of the Schoch Patent No. 1,989,712 and in said paper by Schoch and Cunningham, in accordance with the present invention conversion of calcium sulphate dihydrate to calcium sulphate hemihydrate to form a settable plaster of low water-carrying capacity may be carried on in solutions of metallic salts such as the halides, nitrates and sulphates of sodium, potassium, magnesium, calcium, caesium, zinc, copper and ammonia and including specifically sodium chloride and calcium chloride stated by Schoch and Cunningham to be unsuitable for the production of acceptable low water-carrying plaster. Moreover, with the metallic salts used in the present invention crystals of the type which may be produced by the process of the Randel and Dailey Patent No. 1,901,051 may be produced. The invention is concerned with a process of producing calcium sulphate hemihydrate by heating calcium sulphate dihydrate in a water solution of a vapor pressure depressant, particularly a metallic salt or mixtures thereof, at a pressure not in excess of atmospheric pressure. The product produced by this process will have a water carrying capacity of a similar low degree to that of the product produced by the Randel and Dailey patent, or lower. From the product of the process of the invention hard casts of high strength and high density may be secured when the slurry is mixed at "pouring consistency," which is a consistency substantially the same as that commonly used in moulding or casting operations.

It is well known that the vapor pressure of a solution of a metallic salt in water is lower than the vapor pressure of the water alone at the same temperature. Correspondingly, the boiling point of the solution is greater than that of water at the same pressure. In Bulletin No. 33 of the Bureau of Soils of the United States Department of Agriculture, under title "Calcium Sulphate in Aqueous Solutions" by Cameron and Bell, and in Technical Paper 625 of the Bureau of Mines of the United States Department of the Interior, "Thermodynamic Properties of Gypsum and its Dehydration Products" by Kelley, Southard and Anderson, referring to the work of Van 't Hoff, data and curves are given showing the vapor pressure of calcium sulphate dihydrate in contact with calcium sulphate hemihydrate at various temperatures. There are also given similar data and curves for water as well as solutions of sodium chloride and magnesium chloride and data for solutions of calcium chloride. From other sources it is possible to plot curves showing the relation of the vapor pressure to temperature for solutions of various salts at various concentrations of the salts in the water. As shown in the Bulletin No. 33 of the United States Bureau of Soils, the intersection of the vapor pressure-temperature curve of gypsum with that of the solution of the salt indicates the temperature and the corresponding vapor pressure at which as the temperature of the solution is increased conversion from calcium sulphate dihydrate to calcium sulphate hemihydrate starts. For the purposes of description of the invention, the temperature corresponding to this point of intersection will be referred to as the "inversion temperature."

The invention, in common with the earlier proposals, preferably effects removal of the water of crystallization by heating calcium sulphate dihydrate or gypsum in a solution of a metallic salt. It proposes to carry out this heating at atmospheric pressure. It is a particular feature of the discovery with which the invention is concerned that calcium sulphate hemihydrate in the form of thick, stubby rod-like crystals and having a low water carrying capacity may be secured by controlling within certain limits the difference between the vapor pressure of the solution in which the calcium sulphate dihydrate is immersed and the vapor pressure of the gypsum at the temperature corresponding to said vapor pressure of the solution. That is to say, the vapor pressure difference measured at any temperature lying above the "inversion temperature" of the gypsum in a given solution must be maintained within said limits. The vapor pressure differential between the two curves is a measure of the speed of conversion of the calcium sulphate dihydrate to the calcium sulphate hemihydrate. It has been found that if this difference of vapor pressure is too great the crystals produced will not be of the thick, stubby, rod-like form and the product will not have a water carrying capacity of markedly low degree. If, on the other hand, the vapor pressure difference is too small, the conversion takes place so slowly that the process will not be commercially practical. Contrary to the experience of Schoch and Cunningham who describe crystals which are long and needle-like when produced in solutions other than magnesium sulphate, it is possible when controlling the conditions, and particularly the vapor pressure difference above mentioned, in accordance with the invention to produce the thick, stubby, rod-like crystals and a product of low water carrying capacity and the other qualities above referred to.

The invention may utilize as vapor pressure depressants salts of the alkali metals and of the ammonium radical and of the alkali earth metals. By controlling the degree of concentration of such salt in the water the requisite difference between the vapor pressure of the gypsum and the vapor pressure of said solution may be obtained. Since for each degree of concentration the vapor pressure of the solution is determined by the temperature of the solution, it becomes possible in a series of curves of the vapor pressure of the solutions which are plotted to the same scale as the vapor pressure-temperature curve for gypsum to show the intersections of these solution curves with the gypsum curve and thus determine the vapor pressure and the corresponding temperature at which conversion of the dihydrate to the hemihydrate submerged in the solution will start, i. e., the "inversion temperature." The minimum difference determined in accordance with the proposals of the invention, as above referred to, between the vapor pressure of the gypsum and that of the solution, that is, a minimum excess of the former with respect to the latter, may be gauged for each of these solution curves. Correspondingly, the maximum allowable difference between the vapor pressure of the gypsum and that of the solution in which the gypsum is immersed also may be gauged for each of these solution curves. In the latter instance, however, this pressure difference in some cases within the scope of the invention may be between the vapor pressure of the solution at the boiling temperature of the solution at atmospheric pressure and the vapor pressure of the gypsum at the same temperature.

While in the work of Van 't Hoff, above referred to, the temperature designated by Van 't Hoff as the "inversion temperature" and represented by the intersection of the vapor pressure-temperature curves of water and of calcium sulphate dihydrate in contact with calcium sulphate hemihydrate in water is about 107° C. (224° F.), in the Technical Paper 625 of the Bureau of Mines this intersection is indicated as occurring at about 100° C. (212° F.). This is the theoretical point at which a change in the amount of water of crystallization occurs in passing either from the dihydrate to the hemihydrate or the reverse. It may be considered that calcium sulphate dihydrate, gypsum, generally in accordance with the ideas expressed by Van 't Hoff, cannot exist in stable condition in contact with calcium sulphate hemihydrate at a temperature higher than that represented by the intersection of the curves, that is, the "inversion temperature." For the purposes of the invention, however, this intersection is considered to occur at 212° F., 760 mm. of mercury vapor pressure in water or in a saturated water vapor in accordance with said Technical Paper 625.

In applying these considerations in the present invention it is found, however, that by extrapolating the curve of gypsum above the temperature 212° F. it is possible to use the vapor pressure differences determined between the extrapolated curve and the vapor pressure curves of the solutions to arrive at the minimum vapor pressure difference and the maximum vapor pressure difference which substantially will establish the range of these vapor pressure differences and, therefore, for each solution, the range of temperatures at which conversion from the dihydrate to the hemihydrate must be carried on in order to secure the desired plaster. Control thus based on extrapolation of the gypsum curve is found to be effective to secure the desired product, notwithstanding the fact that the pressure difference so determined may or may not represent a difference between actually existing vapor pressures of gypsum and of the solution. In accordance with these methods of determining the pressure difference, it has been found that said range of vapor pressure difference substantially lies between 150 mm. and 1000 mm. of mercury. In view of this discovery for the production of crystals of calcium sulphate hemihydrate of the type above referred to, it is possible when using various inorganic salts selected from the group consisting of salts of the alkali metals and of the ammonium radical and of the alkali earth metals to produce the desired low water carrying product, with its characteristic crystals.

It has been found that satisfactory results are obtained by using as the inorganic salt any of the following salts either alone or in admixture, one with another:

Ammonium chloride, ammonium bromide, ammonium iodide, ammonium nitrate, ammonium sulfate, calcium chloride, calcium bromide, calcium iodide, calcium nitrate, magnesium chloride, magnesium bromide, magnesium iodide, magnesium nitrate, sodium chloride, sodium bromide, sodium iodide, sodium nitrate, potassium chloride, potassium bromide, potassium iodide, potassium nitrate, caesium chloride, caesium nitrate, caesium sulphate, zinc chloride, zinc bromide, zinc iodide, zinc nitrate, zinc sulfate, cupric chloride, cupric bromide, cupric nitrate, cupric sulfate.

In the drawing is shown a set of curves, such as has been above mentioned, for solutions of calcium chloride. The several vapor pressure-temperature curves are plotted for solutions of various concentrations of the salt in the water, the percentage being expressed as the weight of anhydrous calcium chloride based on the weight of the water in which the salt is dissolved. For comparison, also, on this set of curves is shown the vapor pressure-temperature curve for water. All of these curves are carried to the boiling temperature of the solution at normal atmospheric pressure or to a temperature below boiling temperature which provides the maximum vapor pressure difference of 1000 mm.

The vapor pressure-temperature curve A for gypsum is based on data obtained from the Technical Paper 625 of the Bureau of Mines for the portion of curve A, up to and including the intersection with the vapor pressure curve for water, this intersection occurring at 212° F., as above stated. For extrapolation of this curve above 212° F., the vapor pressure-temperature curve of gypsum up to 212° F., as shown in said paper, was plotted to logarithm scale. While this logarithmic curve is not exactly a straight line, the curvature is slight and uniform. The extrapolation, therefore, by graphically extending the curve at the same curvature above 212° F. is sufficiently accurate for the purposes of the present invention. It has been found that such extrapolation serves as the basis for determination of the measure of the pressure difference between that of the gypsum and that of the solution in which the gypsum is immersed.

Conversion of the calcium sulphate dihydrate to calcium sulphate hemihydrate to produce the type of product above referred to may be carried out in solutions in which the selected salt or mixture of selected salts is dissolved in such amount that the conversion will take place at a temperature which in some cases may be below the normal "inversion temperature" of gypsum to hemihydrate in pure water, namely, 212° F., or in other cases may be above this temperature. The minimum pressure difference of 150 mm. ordinarily falls on ordinates in the curve which are below the normal "inversion temperature" in water, namely, 212° F., although in some cases with solutions of lower concentration this minimum pressure difference may be obtained at a temperature of above 212° F. which may be the boiling temperature of the solution. The maximum pressure difference, namely, 1000 mm. of mercury, will fall on ordinates which are in excess of 212° F. In some cases, however, with solutions of higher concentration this maximum pressure difference may be reached at a temperature which is less than the boiling temperature of the solution at atmospheric pressure. With such solutions of high concentration the vapor pressure difference may greatly exceed 1000 mm. at the boiling temperature of the solution at atmospheric pressure. In such cases, therefore, it becomes necessary to limit the temperature to which the solution is raised so that it will not reach the boiling temperature at atmospheric pressure in order not to exceed the vapor pressure difference of 1000 mm. On the other hand, for solutions of intermediate concentration the solution may be heated to the boiling temperature without exceeding the maximum pressure difference of 1000 mm., although generally this vapor pressure difference will be substantially in excess of 150 mm.

Conveniently, however, the process of the invention may be practiced at the boiling temperatures of the solution. Examination of the curves will show that for calcium chloride, for example, the pressure difference measured at the boiling temperature at atmospheric pressure, that is between 760 mm. and the vapor pressure of the gypsum at the same temperature, for any solution within the range of 20% and 70% concentration will lie within the range between 150 mm. and 1000 mm. of mercury, which according to the invention it has been found will insure the production of the calcium sulphate hemihydrate having the desired crystal form and physical properties.

*Table I*

| CaCl₂ | Operating Temperatures, Degrees Fahr. | | Max. Vapor Pres. Diff. mm. at Boiling [2] |
|---|---|---|---|
| | Minimum at 150 mm. | Maximum at 1,000 mm. or at Boiling | |
| 15 | | 219.5 at boiling | 100 |
| 20 | 219.5 | 224 at boiling | 150 |
| 30 | 213 | 229 at boiling | 245 |
| 40 | 204 | 235 at boiling | 360 |
| 50 | 194 | 241.5 at boiling | 510 |
| 60 | 186 | 248 at boiling | 690 |
| 70 | 181 | 246 below boiling | 880 |
| 100 | 175 | 238 below boiling | 1,430 |
| 150 | 168 | 227 below boiling | 2,770 |
| | [1] 160 | [1] 227 below boiling | [1] 7,360 |

[1] Approximately saturated solution.
[2] At 760 mm. barometric pressure.

In Table I, for various percentages of concentration of the calcium chloride in the solution, are shown the minimum and maximum operating temperatures at 760 mm. barometric pressure corresponding, respectively, to the minimum vapor pressure difference of 150 mm. and the maximum vapor pressure difference, which for solutions of higher concentration may reach 1000 mm. Some of the solutions of lower concentration, however, as stated above boil at such a temperature that the pressure difference between the pressure at boiling temperature, namely, atmospheric pressure 760 mm. of mercury, and the vapor pressure of the gypsum as indicated by curve A extrapolated, is less than 1000 mm. These values at boiling temperatures are shown in Table I in the last column.

In the curves the minimum pressure difference of 150 mm. for the 30% solution, for example, is, as indicated by the portion L of the ordinate, measured between the vapor pressure curve of the solution at this concentration and the vapor pressure curve of the gypsum. This ordinate will be found at the temperature of 213° F., as indicated above in Table I. For this 30% solution, also, the portion M of the ordinate at the boiling temperature, namely, 224° F., lying between the vapor pressure curve for this solution and the vapor pressure curve of the gypsum is found to have a value of 245 mm., also indicated in Table I. This represents the maximum pressure difference attainable for carrying on the process when using this 30% solution.

Similarly, for the 70% solution, the portion S of the ordinate at 181° F. which lies between the curve for this 70% solution and the gypsum curve has a value of 150 mm. For this 70% solution, at the temperature 248° F. the portion T of the ordinate lying between the curve for the solution at this concentration and the gypsum curve extrapolated has a value of about 880 mm. The solution boils at this temperature so that the full maximum difference of 1000 mm. cannot be attained at atmospheric pressure. Table I shows the maximum vapor pressure difference attainable at boiling for the various solutions of various concentrations. It will be apparent that with solutions of higher concentration than 70% the maximum vapor pressure difference of 1000 mm. may be attained or exceeded. By controlling the temperatures of the solution in which the gypsum is being heated, however, to that shown in the table, the maximum pressure difference of 1000 mm. may be controlled in the solutions of higher concentration.

In order to carry out the process, therefore, a solution of given concentration may be chosen. From the curves or from the table the temperatures corresponding to the minimum and the maximum vapor pressure differences then may be found. The solution in which the gypsum is immersed then may be heated to a temperature controlled at a point lying in the range between said two temperatures so determined. It has been found in accordance with this method of control to secure the type of calcium sulphate hemihydrate above referred to, and in consideration of the element of time, desired low water carrying capacity of the plaster produced, and the strength, density and hardness of the cast made therefrom, that the concentration of the salt in the solution and the temperature to which such solution may be heated may be so chosen that preferably the vapor pressure difference lies substantially in the range between 170 mm. and 450 mm. of mercury. In the case of solutions of calcium chloride, the preferred concentration of the solution thus may lie in the range between about 22% and 48% at boiling temperature.

While it is possible to produce the desired product with solutions which provide a vapor pressure difference of less than 150 mm. of mercury, the heating in such case must be carried on for such a period of time that the process becomes commercially impractical. For example, in a 70% solution of calcium chloride the stubby, rodlike crystals were made by heating high purity gypsum rock which all passed a ½" screen, in the solution to a temperature, approximately 149° F., providing a vapor pressure difference of about 47 mm. but the time was about four days. In general, with the salts of the group above disclosed as vapor pressure depressants suitable for the purposes of the invention, not substantially less than 15% of the salts of high solubility will be required to produce the product in any reasonable time.

*Table II*

| Boiling Temp., ° F. | Vapor Pres. Difference mm. Hg | Approximate Conversion Time, Hrs. | Pouring Consist. | Kind of Crystals |
|---|---|---|---|---|
| 217 | 110 | Barely started in 8 hours. | | |
| 220 | 170 | 3¾ hrs | 45 | almost all short, rodlike. |
| 227 | 320 | 2½ hrs | 45 | Do. |
| 233 | 470 | 2¼ hrs | 48 | largely rodlike, few needles. |
| 247 | 860 | 1½ hrs | 51 | largely rodlike, some needles. |
| 263 | 1,440 | 1¼ hrs | 57 | largely needles. |
| 289 | 2,780 | ½ hr | 65 | almost all needles. |

In Table II are shown the results of carrying out the process of the invention in calcium chloride solutions at boiling at atmospheric pressure of approximately 750 mm. The vapor pressure differences in this table are taken from the curves as the difference between the vapor pressure of the gypsum at the temperature indicated and the atmospheric pressure of 750 mm. After completing the conversion the product was washed substantially free of CaCl₂, dried at a temperature not markedly below 212° F., and then ground in a steel disc attrition mill. The pouring consistency and form of the crystal were then determined. Ball milling the converted and ground product results in a further lowering of the pouring consistency. For instance, a pouring consistency of 45 after disc grinding was reduced in 30 minutes of ball milling to 40.

In Table II, for the maximum vapor pressure differences attainable at boiling as above mentioned are given the time in hours in which conversion takes place to the hemihydrate of the type which it is the object of the invention to produce. These observations were made in converting gypsum in which the pieces or particles were of such size that all passed through ½" mesh screen. In Table II, also, are given the pouring consistencies of the product thus produced by heating in the calcium chloride solutions. In the right-hand column of Table II is indicated in general terms the type of crystal which was formed, as seen under the microscope. It will be noted that where the time was reduced below one and one-half hours the crystals become long and needlelike and the pouring consistency is above 51. These pouring consistencies were determined upon the plaster ground to a fineness such that approximately 95% thereof passed through a 100 mesh sieve.

As above stated, however, the process preferably is carried out at the boiling temperature of the solution. Operation at the boiling point makes unnecessary a temperature control to insure that the vapor pressure difference is not exceeded and, on the other hand, that it is always maintained at sufficient amount to insure conversion of the gypsum to the hemihydrate in the form of the desired crystals. When the conversion is carried on with the solution at the boiling temperature, there is secured the advantage that the water of crystallization which is removed from the gypsum and thus tends to dilute the solution is offset to substantial degree by the evaporation of the water from the solution. Depending upon the concentration of the solution selected, more or less water will be required to maintain the desired concentration, or additional amounts of the salt may be added from time to time to insure that the concentration is maintained.

In connection with the operation of the process at boiling temperatures of the solutions, it also should be noted that the speed at which the conversion takes place, that is, the time required to completely effect change from calcium sulphate dihydrate to calcium sulphate hemihydrate, may be controlled or modified by change in the concentration of the solution in which the gypsum is submerged while maintaining the difference between the vapor pressure of the solution and the vapor pressure of the gypsum within the range 150 mm. to 1000 mm. of mercury.

As the preferred condition of carrying on the process of dehydration of gypsum and re-crystallization to hemihydrate of the type above referred to, a water solution of calcium chloride is adjusted so that the boiling temperature of the solution is, for example, in the range between 225° F. and 230° F. at atmospheric pressure. This concentration, depending upon the barometric pressure at the place in which the process is carired out, the impurities in the salt and in the water, and the degree of dilution which the water of crystallization as it is removed may produce in the solution, and the size of the particles or pieces of the gypsum, will lie roughly in the range between 30% and 45% of the calcium chloride based on the weight of the water in which it is dissolved. The pulverized or crushed gypsum rock is then immersed in the solution and the solution is heated until it boils.

Boiling is continued until the gypsum is substantially completely converted to the hemihydrate. The time required for this conversion with the solution at such concentration will be generally in the range between two and one-quarter to three hours, as indicated in Table No. II. The rate of conversion, however, is affected by the size of the rock particles or pieces. The outside of a lump or piece of rock is first converted and conversion gradually progresses inwardly to the center of the lump or piece. If the size of the pieces or particles of the rock is so reduced that the material containing various particle sizes substantially all will pass through a half-inch mesh, conversion may be, in general, completed within two to four hours, the shorter time being attainable with more finely crushed raw material.

Since the water of crystallization which is driven off from the gypsum mixes with the water solvent, the solution will become diluted unless, in carrying out the process at boiling temperatures, the evaporation equals or exceeds the rate of release of the water of crystallization. If the rate of evaporation due to boiling exceeds removal of the water of crystallization, then the solution tends to become concentrated and must be diluted in order to avoid rise of its temperature which will increase the vapor pressure difference beyond the above indicated range of 225° F. to 230° F. which is preferred for producing the hemihydrate of the type to which the invention relates. It is apparent that the condition which actually obtains, that is, whether the evaporation is less than, equals or exceeds the amount of water of crystallization removed from the gypsum, depends in part upon the amount of the gypsum in relation to the amount of the solution in which at the boiling temperature of the solution the gypsum is immersed. It depends also upon the rate of boiling, i. e., evaporation, of the solution.

It is possible readily to control the conditions of such operation so as to maintain the requisite difference in the vapor pressures of the solution and of the gypsum. If the evaporation of the water from the solution exceeds the rate of release of water of crystallization from the gypsum so that the boiling temperature of the solution tends to rise above 230° F., water may be added to maintain the boiling temperature to within the range between 225° F. and 230° F. This may be accomplished, if desired, by returning in whole or in part to the cooking vessel the vapor collected from the vessel and condensed in a suitable condensing apparatus. If, on the other hand, the water so collected and condensed and returned to the solution is sufficient to tend to cause the boiling temperature thereof to drop below 225° F., some of the water may be by-passed or more calcium chloride may be added to the solution to increase the concentration and thus restore the boiling temperature to the range between 225° F. and 230° F. In this method of carrying out the process of the invention in boiling solutions, for example, in the range of temperature 225° F. to 230° F., it is merely necessary to observe the temperature of the boiling solution in order to determine change in the concentration of the solution. Such operation at boiling temperature makes unnecessary an accurate thermostatic control such as would be required if the concentration of the salt used were such that the temperature thereof might reach or rise above that corresponding to the maximum vapor pressure difference, namely, 1000 mm., before the solution boils. Moreover, operation at boiling temperatures in solutions of suitable concentration as above described insures such a rate of conversion that the operation becomes commercially practical because of the provision of an adequate but not excessive vapor pressure difference.

When any of the solutions is boiled while subjected to atmospheric pressure, the actual vapor pressure of the solution at the boiling temperature is substantially the barometric pressure at the time and location, this pressure being normally 760 mm. of mercury. From the curves it will be found that at 225° F. the vapor pressure of gypsum in contact with the hemihydrate is substantially 1030 mm. of mercury. At 230° F. the vapor pressure of gypsum is substantially 1150 mm. of mercury. In a boiling solution of calcium chloride under standard atmospheric pressure the vapor pressure difference at 225° F., therefore, is 270 mm. and at 230° F. is 390 mm. of mercury. These vapor pressure differences lie in the preferred range as above indicated. Experience has shown that carrying out of the process in calcium chloride solutions with control of the temperature of boiling in the range between 225° F. and 230° F. to produce the vapor pressure differences in such range will secure production in a commercially suitable time of the low water carrying product having the physical properties which have been above described and which is characterized by the stubby, rodlike crystals of the hemihydrate.

When the conversion of the gypsum immersed in the solution to the hemihydrate is completed, by the use of suitable apparatus, the dehydrated product may be washed in boiling hot water and the portion of the calcium chloride solution which clings to the dehydrated material may be removed without rehydration of the hemihydrate to calcium sulphate dihydrate. It is necessary, however, that the temperature shall not be permitted to fall to any marked degree below 212° F. to avoid rehydration. Since, however, in the process of the invention the vapor pressure depressants which are used are salts which are readily soluble in water, the washing operation is readily effected in a short time so that any great amount of cooling is prevented.

When the excess of the solution is sufficiently removed, the hemihydrate is dried without permitting it to cool to any temperature markedly below 212° F. before removal of substantially all the free water in order to prevent the water from re-combining to any appreciable extent with the hemihydrate. This drying temperature, however, should not be much in excess of 350° F. in order to prevent further dehydration to calcium sulphate anhydrite. The dried product may then be ground to the desired fineness of particle size.

*Table III*

| Vapor Pressure Difference mm. Hg | Tensile Strength— Lbs./Sq. In. | | Testing Consist. | Pouring Consist. |
|---|---|---|---|---|
| | At Testing Consistency | At Pouring Consistency | | |
| 170 | 1,096 | | 32 | 45 |
| 235 | 1,050 | | 32 | 45 |
| 320 | 1,187 | 763 | 32 | 45 |
| 470 | 951 | | 33 | 48 |
| 860 | 822 | | 38 | 51 |
| 1,440 | 625 | 435 | 40 | 57 |
| 2,780 | 449 | 320 | 42½ | 65 |

In Table III are given the results of tests of tensile strength of the casts made of the plaster produced by the above described method of dehydrating gypsum by immersion in a boiling solution of calcium chloride. By varying the amount of salt in the solution and raising the solution to the boiling temperature, for these tests, the process was carried out to secure dehydration at various vapor pressure differences as shown in Table III. It will be noted that the tensile strength of the casts made from the plaster decreases as the vapor pressure difference increases. The casts for these tests were made from slurries in which the plaster was mixed with water at testing consistency and in some cases also at pouring consistency. The amount of the water used to produce these consistencies in each case is given in the respective columns for consistency at the right of the table.

The marked difference in strength between the casts made at 170 mm. and 2780 mm. vapor pressure difference is accounted for by the characteristic of the process that when the vapor pressure difference becomes too high the crystals become of the long needlelike character and no longer have the short rodlike form. While in some cases, that is, when produced with a relatively high vapor pressure difference, for example 860 mm., the plaster may not have as high a strength as may be secured with a lower vapor pressure difference, the water carrying capacity of the plaster, even with such relatively high vapor pressure differences, may be substantially below that of plasters produced by ordinary calcining methods, for example, the plasters produced by calcining in a kettle. Such plasters, when made of the same rock of high purity as used in the tests of Table III, ordinarily have a pouring consistency of not substantially less than 70 parts of water for 100 parts of the plaster. By controlling the operation of the process so that the vapor pressure differential does not exceed 1000 mm. of mercury, water carrying capacities not substantially greater than 60, and in the preferred case below 50 at pouring consistency, may be produced.

*Table IV*

| Salt Used | Approx. Concentration | Boiling Temp. | Conversion Time | Testing Consist. | Pouring Consist. |
|---|---|---|---|---|---|
| | *Percent* | ° *F.* | | | |
| CaCl₂ | 42 | 230 | about 2 hrs | 34 | 47 |
| NaNO₃ | 80 | 230 | 1½ to 2 hrs | 32 | 45 |
| KI | 115 | 230 | 1¼ to 1¾ hrs | 32 | 45 |
| Ca(NO₃)₂ | 153 | 230 | 1½ to 2 hrs | 32 | 45 |
| CaBr | 91 | 234 | 1½ hrs | 35 | 48 |

In Table IV are given the results made with different salts used as the vapor pressure depressant. In each case such a percentage of concentration of the salt in the solution was used that substantially all the solutions were brought to the same boiling temperature, namely, about 230° F. The amount of each salt in percent of the weight of the water used is indicated in the second column of the table. In the fourth column of the table is given the conversion time which, it will be noted, was about one and one-fourth to two hours. The fact that there was no great variation in the amount of time necessary to accomplish the conversion from the dihydrate to the hemihydrate is explained by the fact that the boiling temperature of about 230° F., regardless of the salt used to produce this boiling temperature (the quantity of the salt being varied as above mentioned), insured a definite vapor pressure difference. This vapor pressure difference corresponds to the portion of the ordinate V at the temperature of 230° F. in the curves measured between the existing atmospheric pressure of about 750 mm. and the vapor pressure curve A for gypsum. This vapor pressure at 230° F. for gypsum is 1150 mm. The vapor pressure difference, therefore, is 400 mm.

Where the solution of the salt is a saturated solution there should be a vapor pressure difference of at least 400 mm. (or a pressure difference of at least 250 mm. lower than the corresponding vapor pressure of calcium sulphate dihydrate in contact with calcium sulphate hemihydrate at the corresponding temperature). In any event the difference between the vapor pressure of the solution and the vapor pressure of the gypsum should be maintained between 150 mm. and 1000 mm.

In this table in the fifth column is given the "testing consistency" of the plasters which were produced by dehydration in the several solutions indicated in this table. The testing consistency for which the values are given in this table and in Table III is defined as:

"Testing consistency is the number of cubic centimeters of water which, when mixed with 100 grams of the dry plaster in a mixing cup, will produce a mortar that will slump about ⅛″ when the mass is pushed to one side of the cup with the mixing spatula and the spatula is then withdrawn."

The corresponding pouring consistencies, measured as hereinabove defined for the purposes of this invention, are shown in the sixth column. It will be apparent from the table that control of the vapor pressure difference in accordance with the invention is effective to secure the low water carrying capacity which is a desired property of the calcium sulphate hemihydrate or gypsum plaster of the invention, when conversion is carried out in solutions of various salts. While various water soluble salts of the alkali metals or of the ammonium radical or of the alkali earth metals may be used in sufficient concentration to provide the requisite vapor pressure difference in the range between 150 mm. and 1000 mm., the salts of the metals of these groups or of the ammonium radical which are formed with the halogen acids or with nitric acid, because of their high solubility and consequent marked effect in depressing the vapor pressure of the solutions, are preferred. Tests have indicated that the salts of calcium other than calcium sulphate, which therefore have a common metal base with the calcium sulphate content of the gypsum, are particularly advantageous because they do not react with the calcium sulphate and, therefore, the possibility is minimized of forming complex salts or reaction products which would interfere with the formation of the desired hemihydrate.

Contrary to the conclusions of Schoch and Cunningham, the process may be carried on in a sodium chloride solution. Using high purity gypsum rock ground to approximately 85 percent through a 100 mesh sieve, the conversion has been effected in a saturated solution of sodium chloride at temperatures in the range of 174° F. to 211° F., these temperatures being below the boiling temperature of the solution. After about five and one-half hours heating, the salt solution was siphoned off from the cooking vessel and the hemihydrate was washed with boiling water to remove substantially all of the sodium chloride. The hemihydrate was then dried at approximately 212° F. When dry it was found that the mass of hemihydrate in the cooking vessel was in a caked condition. The caked mass was broken up, ground and screened through a 100 mesh screen. The resulting product had a testing consistency of approximately 33 and had a setting time of about 7 minutes. The set, dry cast was much harder and stronger than a cast made of ordinary calcined gypsum at testing consistency.

Consideration of the data presented in the tables and the discussion above given with respect to producing the desired product by boiling the solution, for example, at a temperature lying in the range between 225° F. and 230° F., indicates that it is possible to produce the desired product by means of a solution in water of any vapor pressure depressant of the type above mentioned as suitable for the invention to secure the requisite vapor pressure difference by using a greater or less amount of a salt in the solution. It is merely necessary to add the vapor pressure depressant, that is, the salt, until the desired boiling temperature is reached. This will insure that the vapor pressure difference, always between barometric pressure, normally at sea level 760 mm., at the location and time of the operation and the vapor pressure of the gypsum at the boiling temperature shall be a definite amount. By selecting the proper boiling temperature of the solution, therefore, the vapor pressure difference may be controlled within the range which it has been discovered, according to the invention, will produce the hemihydrate of the desired crystal form.

Moreover, mixtures of different vapor pressure depressants of the type above indicated as suitable for the invention may be used to produce a given boiling temperature. Indeed, it is immaterial that the proportions of these salts in relation to each other shall be known or that the total amount of either or all of them shall be known if sufficient amount of the soluble salts are added to the water to secure the boiling temperature to provide the requisite vapor pressure difference. Within the scope of the invention, therefore, any vapor pressure depressant of the type above described may be used which is capable of substantially raising the boiling temperature of water solution so that the vapor pressure difference between the atmospheric pressure and the vapor pressure of gypsum at the boiling temperature will not substantially exceed 1000 mm. As has been stated, in order to limit the time of conversion, in general the temperature at which the process will be carried on will be such that the vapor pressure difference will be not substantially less than 150 mm. While conversion to the crystals of the type desired may take place at vapor pressure differences less than 150 mm., any substantial reduction in this vapor pressure greatly increases the time of conversion so that the process becomes commercially impractical. Moreover, the pouring consistency and the other qualities of the product are not markedly improved by further reduction in the vapor pressure difference.

It is possible also to meet the condition of variation from the normal of 760 mm. in the barometric pressure which may be occasioned by elevation above sea level or other causes when carrying on the process at boiling temperatures. To do so the desired vapor pressure difference, for example 243 mm., may be selected. To the observed barometric pressure which obtains at the time and place of operation, for example 630 mm., which may be experienced at about 5000 feet elevation above sea level, is added the selected vapor pressure difference of 243 mm. This total of 873 mm. represents the vapor pressure of the gypsum corresponding to which, from the curve A, may be determined the temperature at which the solution of salt or salts must boil to give the desired vapor pressure difference of 243 mm. This temperature for these conditions is found from curve A to be about 218° F. It is only necessary, therefore, to use a solution of any of the salts in practicing the invention as above described at such concentration that the boiling temperature thereof is 218° F., in the selected example, and to carry on the process at the boiling temperature until the conversion is completed. For other barometric conditions and other desired vapor pressure differences a similar procedure may be adopted.

The product produced by the process of the invention may have a setting time generally in the range between 5 to 25 minutes without the addition of retarders or accelerators. This product, however, may have its setting time accelerated or retarded by the addition thereto of accelerators or retarders which are known in the art and which ordinarily are used in connection with gypsum plasters. That the product is a plaster in which substantially all of the gypsum has been converted to the hemihydrate is evidenced by the fact that under the polarizing microscope these crystals show parallel extinction characteristic of hemihydrate, whereas gypsum or calcium sulphate dihydrate shows oblique extinction. This fact, combined with the fact that when the process is properly carried out the combined water content of the crystals is approximately 6.2% as determined by analysis, indicates that the product is hemihydrate and not a mixture of gypsum and anhydrous calcium sulphate.

The results shown were obtained by calcining small batches of rock in laboratory equipment. A manufacturing plant for the production of the product in large batches on a commercial scale has now been built and put into operation.

In the commercial operation the rock to be calcined is first graded by screening so that all passes a ¾" square mesh screen. Each batch is calcined for about 5 hours in a boiling solution of commercial grade flake calcium chloride with the concentration of solution maintained at such degree that the boiling temperature is 225° F. to 228° F.

After calcination the calcined material is washed and leached with water, dried, ground in a hammer mill, further ground in a ball mill and finally ground in a buhrstone mill. The plaster thus produced is of such fineness that approximately 99.9% passes a 100 mesh sieve, approximately 95% passes a 200 mesh sieve and approximately 80% passes a 325 mesh sieve.

This commercial product has even lower water carrying capacity than the laboratory product and casts made from it at a given consistency, therefore, have greater strength, hardness, and density than casts made of the laboratory product at like consistency. The testing consistency of the commercial plaster is 22 to 23. Casts made at 23 water/plaster ratio have a dry tensile strength of about 1300 pounds per square inch, a dry compressive strength of about 15,000 pounds per square inch.

The pouring consistency of the commercial plaster is about 32 to 33. Casts made at 33 water/plaster ratio have a dry tensile strength of about 1050 pounds per square inch and a dry compressive strength of about 9,100 pounds per square inch.

Having thus described my invention, I now claim:

1. The process of producing calcium sulphate hemihydrate from calcium sulphate dihydrate which comprises immersing the dihydrate in lump form in a solution in water of calcium chloride on the order of 30% concentration, with said lumps of such size as to pass through a 1-inch screen and as to be retained on a No. 8 U. S. standard sieve, and heating said solution and dihydrate at atmospheric pressure to substantially the boiling point, such heating being continued until a substantial portion of the dihydrate is converted into hemihydrate.

2. The process of producing calcium sulphate hemihydrate from calcium sulphate dihydrate which comprises immersing the dihydrate in lump form in a solution in water of calcium chloride on the order of 30% concentration, with said lumps of such size as to pass through a 1-inch screen and as to be retained on a No. 8 U. S. standard sieve, heating said solution and dihydrate at atmospheric pressure to substantially the boiling point, such heating being continued until a substantial portion of the dihydrate is converted into hemihydrate, washing the hemihydrate with water at a temperature not substantially below 200° F. for removing the calcium chloride, drying the washed hemihydrate by the application of heat at a temperature of not substantially less than 200° F., and then grinding the product to the desired fineness.

3. Process of producing calcium sulphate hemihydrate from calcium sulphate dihydrate which comprises immersing calcium sulphate dihydrate in a solution in water of calcium chloride at a concentration not substantially less than 15% of the calcium chloride calculated as the anhydrous salt based on the weight of the water in which said calcium chloride is dissolved, and heating said solution while subjected to atmospheric pressure to an operating temperature in the range up to and including the boiling temperature of the solution at atmospheric pressure, said operating temperature of the solution and the concentration of the solution being maintained such that the resulting vapor pressure of the solution under such conditions is lower than the vapor pressure of calcium sulphate dihydrate in contact with calcium sulphate hemihydrate at said operating temperature by a minimum amount not less than the pressure of a 150 mm. column of mercury and a maximum amount not greater than the pressure of a 1000 mm. column of mercury, such heating being continued until a substantial portion of the dihydrate is converted into hemihydrate.

4. The process of producing calcium sulphate hemihydrate from calcium sulphate dihydrate, which comprises immersing calcium sulphate dihydrate in a solution in water of inorganic salt material, the saturated solution of which salt material in water in the presence of calcium sulphate dihydrate will have at the boiling temperature at standard atmospheric pressure a vapor pressure at least 400 mm. of mercury lower than the corresponding vapor pressure of calcium sulphate dihydrate in contact with calcium sulphate hemihydrate at the corresponding temperature, and treating said solution at an operating temperature and at a concentration such that the resulting vapor pressure of the solution under such conditions is lower than the vapor pressure of calcium sulphate dihydrate in contact with calcium sulphate hemihydrate at said operating temperature by a maximum amount not greater than the pressure of a mercury column of the height of 1000 mm., such heating of the solution and the calcium sulphate dihydrate being continued until a substantial portion of the dihydrate is converted into hemihydrate.

5. The process of producing calcium sulphate hemihydrate from calcium sulphate dihydrate which comprises immersing calcium sulphate dihydrate in a solution in water of inorganic salt material, the salt material being selected from the group consisting of sulphates, nitrates and halides of the alkali and alkali earth metals selected from the group consisting of sodium, potassium, magnesium, calcium, caesium, copper and zinc and of ammonia, but restricted to those salts the saturated solutions of which in water in the presence of calcium sulphate dihydrate will have at the boiling temperature at atmospheric pressure a vapor pressure at least 250 mm. of mercury lower than the corresponding vapor pressure of calcium sulphate dihydrate in contact with calcium sulphate hemihydrate at the corresponding temperature, and treating said solution at an operating temperature and at a concentration such that the resulting vapor pressure of the solution under such conditions is lower than the vapor pressure of calcium sulphate dihydrate in contact with calcium sulphate hemihydrate at said operating temperature by a maximum amount not greater than the pressure of a column of mercury of a height of 1000 mm., such heating of the solution and the dihydrate being continued until a substantial portion of the dihydrate is converted into hemihydrate.

6. Process of producing calcium sulphate hemihydrate from calcium sulphate dihydrate which comprises immersing calcium sulphate dihydrate in a solution in water of inorganic salt material selected from the group consisting of sulphates, nitrates and halides of the alkali and alkali earth metals selected from the group consisting of sodium, potassium, magnesium, calcium, caesium, copper and zinc and of ammonia, but restricted to those salts the saturated solutions of which in water in the presence of calcium sulphate dihydrate will have at the boiling temperature at atmospheric pressure a vapor pressure at least 250 mm. of mercury lower than the corresponding vapor pressure of calcium sulphate dihydrate in contact with calcium sulphate hemihydrate at the corresponding temperature, and treating said solution while subjected to atmospheric pressure at an operating temperature in the range up to and including the boiling temperature of the solution at atmospheric pressure, said operating temperature of the solution and the concentration of the solution being maintained such that the resulting vapor pressure of the solution under such conditions is lower than the vapor pressure of calcium sulphate dihydrate in contact with calcium sulphate hemihydrate at said operating temperature by a minimum amount not less than the pressure of a column of mercury of a height of 1000 mm., such heating of the solution and the dihydrate being continued until a substantial portion of the dihydrate is converted into hemihydrate.

7. Process of producing a plaster from gypsum which comprises immersing calcium sulphate dihydrate in a solution in water of inorganic salt material selected from the group consisting of sulphates, nitrates and halides of the alkali and alkali earth metals selected from the group consisting of sodium, potassium, magnesium, calcium, caesium, copper and zinc and of ammonia, but restricted to those salts the saturated solutions of which in water in the presence of calcium sulphate dihydrate will have at the boiling temperature at atmospheric pressure at least 250 mm. of mercury lower than the corresponding vapor pressure of calcium sulphate dihydrate in contact with calcium sulphate hemihydrate at the corresponding temperature, and boiling said solution while subjected to atmospheric pressure and thus driving off water of crystallization from the calcium sulphate dihydrate until the dihydrate is converted into the hemihydrate, said solution being at a concentration of the salt in the solution sufficient to produce a temperature substantially in the range between 225° F. and 230° F. at boiling.

8. Process of producing calcium sulphate hemihydrate from calcium sulphate dihydrate which comprises immersing calcium sulphate dihydrate in a solution in water of inorganic salt material selected from the group consisting of sulphates, nitrates and halides of the alkali and alkali earth metals selected from the group consisting of sodium, potassium, magnesium, calcium, caesium, copper and zinc and of ammonia, but restricted to those salts the saturated solution of which in water in the presence of calcium sulphate dihydrate will have at the boiling temperature at atmospheric pressure a vapor pressure at least 250 mm. of mercury lower than the corresponding vapor pressure of calcium sulphate dihydrate in contact with calcium sulphate hemihydrate at the corresponding temperature, said solution being maintained at such concentration that its boiling temperature at standard atmospheric pressure is between 218° F. and 248° F., and heating said solution and calcium sulphate dihydrate while subjected to atmospheric pressure to an operating temperature of at least 181° F., until a substantial portion of the dihydrate has been converted to hemihydrate.

GILBERT A. HOGGATT.

(References on following page)

REFERENCES CITED

The following references are of record in the file of this patent:

UNITED STATES PATENTS

| Number | Name | Date |
|---|---|---|
| 1,987,712 | Schoch | Feb. 5, 1935 |

OTHER REFERENCES

Pogg. Ann. (Hoppe-Seyler) 1866, vol. 127, page 161.

Zeitschr. fer Phys. Ch. (Van't Hoff) 1903, vol. 45, page 257.

Mellor, Inorg. & Theo. Chem., Longmans, Green & Co., N. Y., vol. III, 1923, pages 763–767.